No. 698,552. Patented Apr. 29, 1902.
J. J. PEARSE.
GRID OR BROILER.
(Application filed Mar. 8, 1900.)
(No Model.)
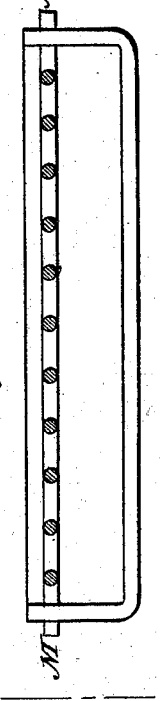
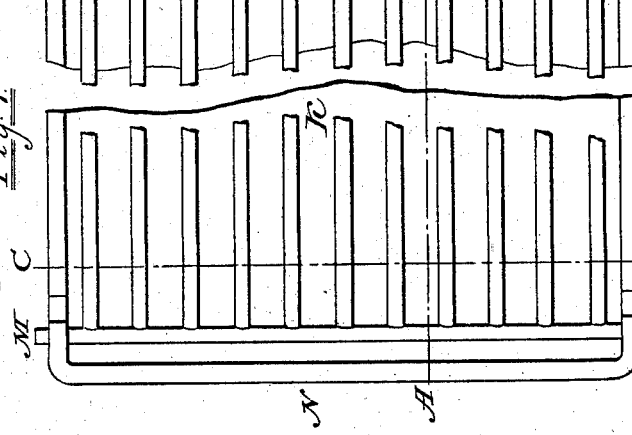
Witnesses.
H. Thurston.
Leonard E. Haynes
Inventor.
Jethro John Pearse.
per Herbert Sefton-Jones
Attorney

UNITED STATES PATENT OFFICE.

JETHRO JOHN PEARSE, OF PERTH, WESTERN AUSTRALIA, AUSTRALIA.

GRID OR BROILER.

SPECIFICATION forming part of Letters Patent No. 698,552, dated April 29, 1902.

Application filed March 8, 1900. Serial No. 7,837. (No model.)

*To all whom it may concern:*

Be it known that I, JETHRO JOHN PEARSE, a subject of the Queen of Great Britain and Ireland, and a resident of Perth, in the Colony of Western Australia, Australia, have invented a certain new and useful Improved Grid or Broiler, of which the following is a specification.

My invention is a simple appliance by which meat may be grilled on Primus stoves or any stoves using gas or oil, as well as upon an ordinary fire of wood, coal, or other fuel. The objects are to prevent the fat and gravy from the meat falling upon the wick or burner of the stove and either clogging it or extinguishing the flame, while on ordinary fires the meat is kept from actual contact with the flame and all the advantage of grilling meat is secured without having the flavor of it tainted by the fumes of the fuel which may be used. These objects are attained by a pan or tray made of sheet or other metal with the edges pressed up all around about three-quarters of an inch or more, which forms a reservoir for the fat or juices of the meat. In one corner of the pan or tray is a lip by which the fat may be poured off from time to time as it accumulates. Above this tray at about three-quarters of an inch or more is placed a wire grid or broiler. This grid or broiler is made so that two pins projecting from the sides of it are made to slip into two beveled slots which are either cut or pressed into the sides of the pan or tray, while on the front of the grid or broiler is a hook which hooks onto one of the wires of the handle of the grid or broiler and keeps it firmly attached to the pan or tray. The pan or tray is also supplied with a handle, so that, if necessary, the hook can be dispensed with and the cook can hold the handles of the pan and grid together. The contrivance of the hook when used is for expeditiously removing the grid or broiler from the pan or tray for cleaning or other purposes.

In the accompanying drawings, Figure 1 is a plan of my grid or broiler. Fig. 2 is a section of same at the line marked A B on Fig. 1. Fig. 3 is a section at C D of the back end of same, showing the bevel into which the projecting pins of the grid or broiler slip. Fig. 4 is a section at E F of the front portion of the same, showing the hook to keep the grid or broiler in its place.

N is the tray or pan.
K is the grid or broiler.
L is the handle of the grid or broiler.
I is the handle of the tray or pan.
M represents the projecting pins on the grid or broiler.
G shows one of the beveled slots on either side of the pan or tray.
H is the hook which fastens the grid or broiler to the tray or pan, and J is the lip of the pan or tray by which the fat and drippings are run off.

When meat is required to be grilled, the grid or broiler is fixed to the tray or pan, as above described, and placed over the fire or flame, and heat is communicated to the pan or tray, which heat in turn by radiation from the pan or tray reaches the meat and cooks it as desired, the fat and juices of the meat falling into the tray or pan, to be removed as required, and being prevented from dropping onto the flame or fire, while the pan or tray effectually prevents the meat from being tainted with the fumes of the gas, oil, or other fuel which may be used. Should it be necessary to remove the grid or broiler, the hook is thrown back and the grid or broiler is released and lifted out of the slots.

Having now described my invention, what I claim as new, and desire to secure by Letters Patent, is—

A broiler comprising a grid having a handle and having extensions from its body to form rests, a receptacle to be placed below the grid and having recesses to receive the said extensions, and having a handle, the two handles being so placed as to be in substantial alinement when the members are assembled, and means for holding the members in their assembled relation.

In witness whereof I have hereunto set my hand in the presence of two witnesses.

JETHRO JOHN PEARSE.

Witnesses:
JNO. FAIRFAX CONIGRAVE,
C. JAHN.